United States Patent Office 3,663,483
Patented May 16, 1972

3,663,483
STEAM JET COOKING METHOD FOR MAKING AQUEOUS RESIN EMULSIONS AND COMPOSITIONS CONTAINING SUCH EMULSIONS FOR COATING PAPER
Clyde W. Steele, Wisconsin Rapids, Wis., assignor to Nekoosa-Edwards Paper Company, Inc., Port Edwards, Wis.
Filed Dec. 15, 1969, Ser. No. 885,058
Int. Cl. C08g 37/18
U.S. Cl. 260—17.2
21 Claims

ABSTRACT OF THE DISCLOSURE

Preparation of an aqueous emulsion of meltable, oil-soluble but water insoluble, acidic polymeric material of phenol-aldehyde or alkyl phenol-acetylene resins, and a protective colloid-forming binder of starches or gums for use as a paper coating composition of between 15 and 70% total solids content. Such an emulsion is prepared by flowing an aqueous stream of resin and starch through a confined heating zone of an eductor system into contact and admixture with a steam jet in such weight proportions and under such pressure and temperature conditions as to convert the resin without further mechanical grinding thereof into spherical particles of about 10 microns or less maximum dimension dispersed in cooked starch as a protective colloid therefor. The final resin-containing emulsion can optionally include pigments, dispersants and anionic surfactants.

BACKGROUND PRIOR ART

As background material relevant to the eductor system and jet cooking method for steam cooking starch, reference is made to the Winfrey and Black Pat. No. 3,133,836, patented May 19, 1964.

With respect to the sensitizing of paper and the like by the use of acid-reacting oil-soluble phenolic polymeric material, reference is made to the aforesaid Phillips and Hein U.S. Pat. No. 3,455,721, patented July 15, 1969. The disclosure in this latter patent of suitable oil-soluble, acidic, phenolic polymeric materials for use in practicing the instant invention is incorporated by reference into the present application.

BRIEF SUMMARY OF THE INVENTION

This invention relates to a jet cooking and dispersion method for making resin-in-aqueous starch emulsions for coating, impregnating or partially impregnating porous substrates, particularly fibrous materials, such as paper, in the making of sheet material sensitized to color upon contact with colorless oily marking liquids of basic reactant properties. The term "paper" as used herein is intended to include fibrous material in sheet or web form.

I have unexpectedly discovered that a system such as disclosed in Pat. No. 3,133,836 for a steam jet method of cooking starch can be readily modified to prepare relatively stable aqueous emulsions or dispersions of resin in the form of spheroidal particles the major portion of which are spheres less than 10 microns in diameter. This is accomplished by jetted steam turbulence, without expensive and time-consuming mechanical attrition. Such emulsions are useful in coating or impregnating paper. In Pat. No. 3,133,836, an aqueous slurry of raw starch is passed through a steam eductor unit to convert the starch into a cooked starch in a confined zone of the unit maintained at a predetermined temperature and pressure, and a proper proportion of steam-to-starch slurry to provide from 1.25 to 5 times the amount of steam that is condensed as said steam raises the slurry to the predetermined temperature and pressure selected for the operation of the system. In general, a sufficient quantity of steam at a suitable temperature, pressure and quality (dryness) is mixed under turbulent conditions with the starch slurry to effect the cooking of the starch with a resultant condensation of steam that is brought into contact with the slurry and with a release of exhaust steam.

Instead of a slurry of starch by itself, or in addition to starch, my present invention involves introducing under positive pressure a stream of an aqueous slurry of a suitable fusible polymeric material, such as an oil-soluble but water-insoluble phenolic type polymer, into an eductor for turbulent admixture with jetted steam in an amount and at a temperature and pressure such as to convert the aqueous slurry of resin particles into an aqueous emulsion in which the dispersed solid resin particles are melted and subdivided within the range of from about 0.25 of a micron to 10 microns. In the same operation, if a raw starch is used, the raw starch is converted into a colloid for the extremely finely divided melted and subsequently congealed phenolic resin particles in the resulting emulsions.

The term "eductor" is used herein to indicate the mixing device into which steam is introduced under pressure in the form of a jet, and a slurry, also under pressure, is pumped into the path of the jetted steam for admixture therewith.

In addition to starch, the final resin-containing emulsion preferably includes a finely divided pigment, such as silica ($SiO_2$), a silica-gel, a natural or synthetic clay, and/or calcium carbonate. Where calcium carbonate is used, it is preferably blended with a finely divided silica, using a dispersant for the calcium carbonate, such as a complex glassy phosphate produced by a thermal process. A particularly desirable polyphosphate dispersant is that known by the proprietary name "Calgon-Composition T," sold by Hagan Chemicals & Control, Inc., P. O. Box 1346, Pittsburgh 30, Pennsylvania, which, in combination with calcium carbonate, forms slips of low viscosities and good stability with respect to aging and alkalinity.

Suitable acidic polymeric materials include water-insoluble but oil-soluble acid polymeric materials such as phenol-aldehyde and phenol acetylene polymers.

Among the phenol-aldehyde polymers found useful are members of the type commonly referred to as novolacs, which are characterized by solubility in common organic solvents, and which are, in the absence of cross-linking agents, permanently fusible. Another group of useful phenol-polymeric materials is the alkyl-phenol-acetylene resins, which are soluble in common organic solvents and possess permanent fusibility in the absence of being treated by cross-linking materials. Generally, the phenolic polymer material useful in practicing the invention is characterized by the presence of free hydroxyl groups and the absence of groups, such as methylol, which tend to promote infusibility or cross-linking of the polymer, and by their solubility in organic liquid solvents and their relative insolubility in aqueous media. Resoles, if they are still soluble, may be used, though subject to change in properties upon aging.

In general, it is preferable to use as the starting material an aqueous slurry of a coarsely ground (10 to 20 microns) thermoplastic para-phenyl polymer, such as one having several repeating units, at least, such as a trimer. Such a slurry can be produced by mechanically grinding, as in an attritor. The resulting ground polymer is referred to as being coarsely ground but only in relation to the very fine particle size (from around 0.25 microns to about 10 microns in diameter) of the spherical particles produced by my steam jet method.

The conversion of the mechanically ground solid polymer to the very fine particle size of between 0.25 and 10 microns, and preferably of around 0.25 to 3 microns, by the practice of this invention, is effected by the melting and emulsifying action of the steam upon the resin particles in the turbulent passage of the aqueous resin slurry through the aforementioned steam eductor. Depending upon the melting point of the polymer or resin, the resulting emulsion, after cooling to below the resin melting point, contains stably suspended particles of spheroidal shape and ranging in size from a lower limit of about 0.25 micron up to a higher limit of 10 microns maximum dimension.

By the action of the starch as a protective colloid, the age-stability of the emulsion is greatly increased. Also, the acid properties of the paper containing the microfine acid resin particles are improved due to the greater number of color sites provided per unit of surface area by the exceptionally fine particle size of the polymer. Data on aging show slower aging of paper sensitized with the improved emulsion because the paper is protected from the atmosphere, in accordance with my present invention, by the protective action of the colloid provided by the starch, gum, or other hydrophilic adhesive material in the coating emulsion.

Jet cooking can be preceded by a preheating of the polymer-containing slurry to a temperature at or above the softening or melting point of the polymer, as for instance, to a temperature of at least 120 to 130° F., using steam at 40 p.s.i.g. and a temperature of 260° F., where the polymer has a melting point of about 120° to 130° F. High melting point polymers, such as those having melting points around 220° F., can be similarly preheated to a temperature of around 200° to 210° F. and then subjected to jet cooking at temperatures up to 375° F. at 75 p.s.i.g. Alternatively, tandem jet cooking may be employed, the first jet cooking constituting a preheating stage to melt the resin, followed by a final jet cooking at high velocity to insure turbulence and the resulting formation of the desired stable emulsion.

One of the advantages of the eductor type device employed in the method of my present invention is that the emulsification of the polymer is accomplished without mechanical attrition and without any sticking of the molten or softened polymer to agitator surfaces or to the wall surfaces of the vessel in which the agitation is carried out. The effectiveness of the emulsification by the use of steam alone in an eductor type device is dependent upon the velocity and turbulence of the steam jet and the amount of steam required to melt the polymer and disperse it as very fine particles in the suspending liquid medium. The polymer particles although then in a liquid state are still water-insoluble.

Other objects, features and advantages of the invention will be readily apparent from the following description of the preferred embodiment of a system for practicing my method, taken in conjunction with the accompanying drawings, although variations and modifications may be effected without departing from the spirit and scope of the novel concepts of the disclosure and in which:

Figure 1:
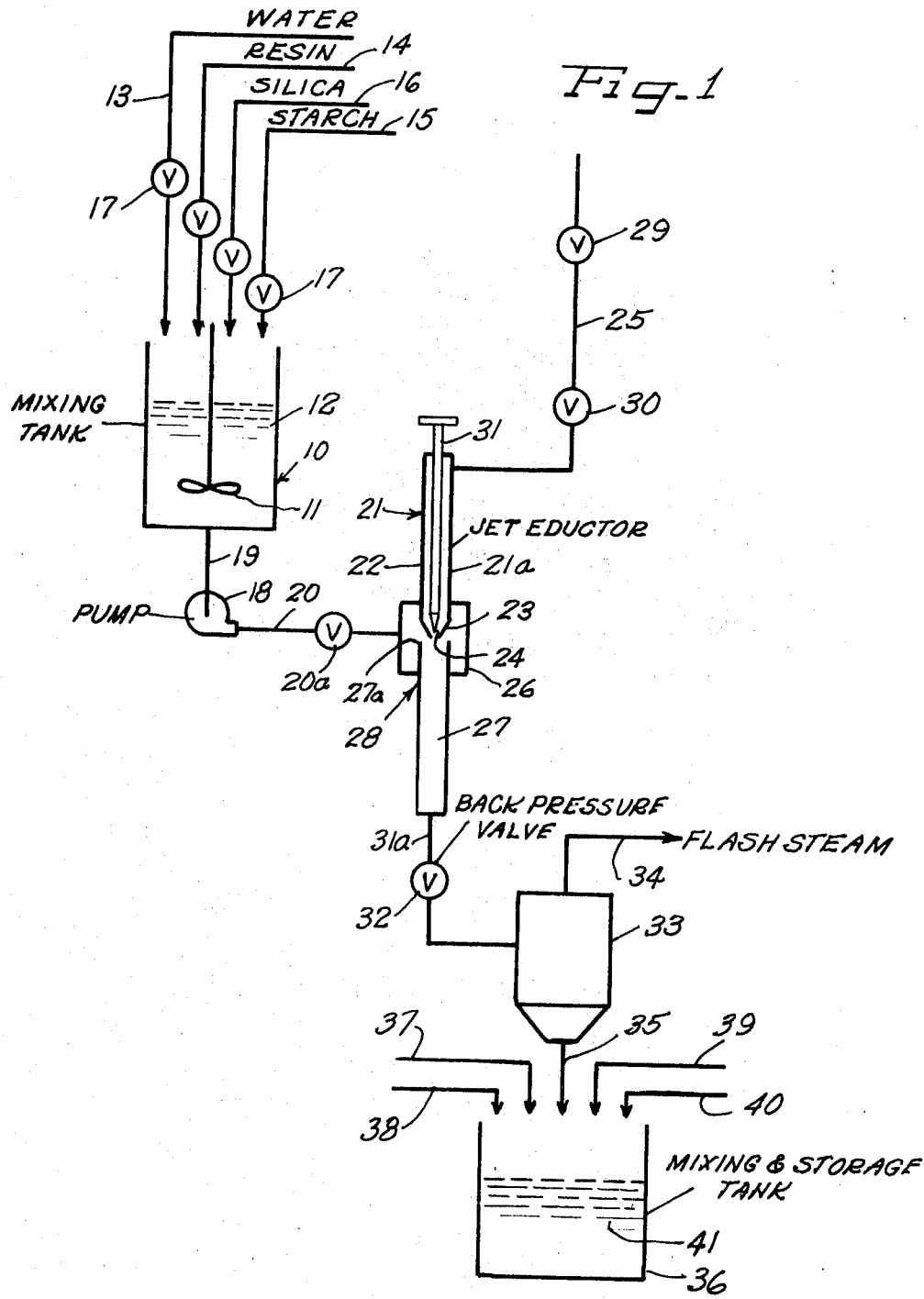
FIG. 1 is a somewhat schematic elevational view of apparatus suitable for carrying out the method of my invention.

The reference numeral 10 in FIG. 1 indicates generally a mixing tank provided with an agitator 11 for mixing an aqueous slurry 12 of polymeric material either formed within the tank 10 or introduced as a slurry into the tank, together with other ingredients of the final emulsion.

As shown, there are four feed lines 13, 14, 15 and 16 for the introduction into the tank 10 of the various constituents that are to be mixed therein. Each of the lines 13 to 16, inclusive, is provided with a valve 17 for controlling the flow of feed materials into the mixing tank 10. The respective feed lines 13 to 16, inclusive, can be used for the introduction of aqueous slurries of resin, starch, silica, and/or other constituents of the slurry that is to be formed or contained within the mixing tank 10. Whatever the manner of introducing the ingredients into the mixing tank 10, the mix 12 is formed in the tank 10 as an aqueous slurry of the various ingredients, with the ingredients in the desired proportions and with the total solids content controlled within suitable limits, such as between 15 and 60%, or even 70%, solids by weight of the slurry.

From the mixing tank 10, the slurry is withdrawn by a pump 18 having an inlet line 19 from the bottom of the tank 10 and is pumped under pressure through a discharge line 20 into a jet eductor system designated as a whole by the reference numeral 21. The jet eductor system 21, which is shown schematically, includes a steam jet eductor 21a and can be of the same general construction shown for the steam treating unit illustrated in FIG. 2 of the aforesaid Pat. No. 3,133,836. The jet eductor 21a comprises a hollow, cylindrical casing 22 which is provided axially thereof at its lower end with a Venturi type fitting 23 having a jet-forming orifice 24 through which a flow of steam (under higher pressure than that of the slurry in the discharge line 20) is discharged at high velocity into an annular chamber 26 enclosing the lower portion of the casing 22. The annular chamber 26 also encloses the upper open end of a tube 27, which is axially aligned with the jet eductor 21 and which provides therewith a treating zone 28. The steam line 25 is provided with valves 29 and 30 for controlling the flow of steam into the casing 22. A needle valve 31 within said casing 22 adjustably controls the opening provided by said jet-forming orifice 24 and consequently the volume rate of discharge of steam through said orifice.

The steam so discharged causes the slurry pumped into the chamber 26 through the inlet line 20 to be educted from said chamber into the open upper end 27a of said tube 27, in which high velocity mixing of the slurry and steam occurs. During such mixing, the adjustment of the needle valve 31 and of the space between the Venturi fitting and the upper end 27a of the tube 27 provides the conditions necessary to convert the slurry of polymer particles into a stable emulsion.

During continued operation of the ssytem, there should be an excess of uncondensed steam in contact with the slurry and with the emulsion into which the slurry has been converted in passing through the treating zone 28. Such conversion of the slurry by the high energy shearing forces acting upon it by the steam into a stable emulsion is thus accomplished by the use of an eductor device having no moving parts, without the formation of any build-up of the resinous dispersed phase on the walls or other surfaces of the eductor unit contacted by the emulsion or slurry. This is most unexpected, since the molten, water-insoluble polymer particles would have been thought likely to have coalesced and formed sticky globules which would adhere to wall surfaces.

As pointed out in the aforementioned Patent No. 3,133,836, an appreciable excess of steam is required over that which will be condensed by raising the temperature of the slurry to the temperature being maintained in the treating zone 28. The amount of excess of uncondensed steam can be varied over a considerable range, but at least 25% excess of steam over the theoretical steam is preferable; or, expressed differently, the quantity of steam introduced into the treating zone should be at least 1.25 times the amount of steam that will be condensed by raising the temperature of the slurry to that maintained in the treating zone. Optimum steam conditions will range from about 1.5 to 3 times the amount of steam that is condensed, and usually it will not be necessary for satisfactory operation to employ more than 5 times the amount of steam that can be condensed.

From the jet eductor 21a, the emulsion formed is discharged through a line 31a provided with a back pressure valve 32, for passage into a flash steam chamber 33. Steam is released through an upper exhaust line 34, while the consequently cooled liquid emulsion with the resin particles dispersed therein is drawn off through a bottom discharge line 35 into a mixing and storage tank 36. Additives in the form of liquid slurries, latices, solutions and the like, can be introduced into the mixing tank 36 through suitable lines, such as the lines 37, 38, 39 and 40, to provide a coating composition, indicated by the reference numeral 41, which will generally have a solids content within the range of from about 15 to 70% solids by weight of the coating composition.

DETAILED DESCRIPTION OF THE INVENTION

While various oil-soluble, but water-insoluble, phenolic polymers having free OH groups, such as previously referred to, can be used as the fusible polymeric material for conversion into a stable emulsion, the following specific polymers are preferred:

p-tert. butyl phenol—formaldehyde resin,
p-chlorophenol—formaldehyde resin, and other aliphatic and aromatic substituted phenol-aldehyde resins in which an electron releasing group is in the ortho- or para-position of the phenol. Commercially available oil-soluble, non-heat-reactive phenolic resins are available, such as Bakelite CKM–5254, which is a 100% para-phenyl phenol-formaldehyde resin having a softening point of between 195° and 225° F. The structural formula for this type of resin is as follows:

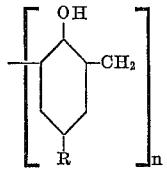

where $n$ is an integer from 3 to 5 and R is phenyl or other substituent group as mentioned previously.

Polymerization of a monomeric phenol to give a compound of the above structure results in a polymer having methylene bridges and no free-para-methylol groups. The presence of methylol groups in the para-positions of the phenolic rings of the finished polymer could result in later cross-linking. No substantial cross-linking is desired, since there then would be a tendency for the polymer to be thermosetting and even to become thermoset.

While phenyl phenol polymers such as described can be emulsified by passing an aqueous slurry of the mechanically ground polymer through the jet eductor system illustrated and described herein, it is preferable where the aqueous polymer emulsion is to be used for coating purposes to include with the resin a hydrophilic material (sometimes referred to herein as a binder material) that is already in colloidal form or is capable of being put into colloidal form by passing through the jet eductor system along with the polymer, thereby providing a protective colloid for the polymeric material that constitutes the dispersed phase of the emulsion. The preferred colloid-forming material is a raw starch from any source, such as corn starch or a root starch, but, in general, various starches and gums, in a granular and uncooked condition can be used. Oxidized, ethylated and other treated starches can likewise be employed.

The following are typical compositions, with the ingredients thereof given in parts by weight, that can be processed by the method of my invention to give satisfactory, stable emulsions for coating and other purposes.

Table I.—Emulsion composition

| Ingredients: | Parts by weight |
|---|---|
| Polymer or resin | 15 |
| Colloidal binder material, e.g. starch | 9 to 14 |
| Water | 22 to 35 |

The ingredients as broadly named in Table I are those necessary to produce an aqueous emulsion of my invention, but the relative proportions thereof can be adjusted depending upon the desired properties of the emulsion. A sufficient amount of a wetting agent, such as Tamol 731, is preferably included in the slurry but can be added to the emulsions after being formed.

Table II.—Composition of slurry for coating

An emulsion composition containing 15 parts of polymer and 9 parts of starch, as shown in Table I, plus 0.1 part of a wetting agent is converted into a suitable coating composition by adding thereto 3 parts by weight of a finely divided silica ($SiO_2$). In general, any emulsion of a composition within the limits given in Table I can be made up into a coating slurry having a solids content within the broad limits of from 15 to 70% by weight, or more preferably, within the narrower range of between 52% and 58% by weight of the slurry. These ranges of proportions for the solids content of the slurries useful for coating purposes hold good for all of the formulations given herein, including the following:

Table III

| Ingredients: | Percent by weight (dry solids basis) |
|---|---|
| Polymer | 15 |
| Starch | 9 |
| Silica | 3 |
| Latex | 5 |
| Clay | 59 |
| Calcium carbonate | 9 |
| Total | 100 |

Sufficient water is added to the dry formulation of Table III to make a slurry for coating purposes having a solids content within the aforestated limits.

A particularly satisfactory silica for use in the above formula for processing in accordance with my present method is a silica-gel such as used in the reproduction paper industry. As an ingredient in the coating composition used for specialized duplicating papers, a silica gel known as Syloid 72 (a proprietary product of Davison Chemical Co., Baltimore, Md.) acts as a dye adsorbent and plays an important part in providing a large internal surface area, thereby enhancing sharp image density with reduced feathering of the impression.

The latex included in Table III can suitably be a styrene-butadiene latex which contains 50% solids, has a pH of about 6.0; a Brookfield viscosity, 95 cps. (100 r.p.m., #4 spindle); is compatible with starch, especially in the neutral pH range; and has a high calcium carbonate stability, especially in conjunction with a dispersant such as a glassy phosphate.

As the clay used in the above formula, coating clays including those known as China clays, are suitable. Clays have the advantage of being cheaper than the silicas, such as silica-gel, but clay can be omitted and silica-gels used to give the bulking of the coating that is desired. Other additives can be included in the final emulsion or in the ultimate slurry used for coating purposes. In addition to the above-mentioned "Tamol 731," which is believed to be the sodium salt of a carboxylated polyelectrolyte sold by Rohm & Haas, other suitable surfactants can be used in an amount of around 0.1% by weight of the final emulsion or slurry composition. Likewise, calcium stearate may be included in the final composition as a coating lubricant in amounts up to one part per thousand parts by weight.

Other permissible additives include germicides to prevent bacterial growth, fungicides to inhibit fungus growths, and defoaming agents.

Since the parts by weight given in Table III are on a dry basis, a coating composition of 50% solids content would require an amount of water equal to the weight of the dry solids content expressed as parts by weight, namely, 100 lbs. of water to each 100 lbs. dry weight of the foregoing formulation, or a total wet weight of 200 lbs.

Typically, in using the steam eductor system above-described, the slurry 12 pumped into the system from the tank 10 would have the following composition:

(1)

| Ingredient: | Weight in pounds |
|---|---|
| Polymer | 15 |
| Starch | 9 |
| Silica | 3 |
|  | ¹ 27 |
| Water | 22 |
|  | ² 49 |

¹ Lbs. dry weight (1a).
² Lbs. slurry, 55% solids.

(2)

After running composition (1) through the jet system the amount of condensate from the weight of steam used would bring the solids content to between 35 and 55% by weight of jet-produced emulsion.

(3)

If a higher solids content were desired, the composition having such higher solids content could be obtained by adding enough more of the dry mix (1a) to the slurry and running it through the jet system. If a lower solids content were desired, the jet-produced emulsion need only be diluted with water.

Figure 2:
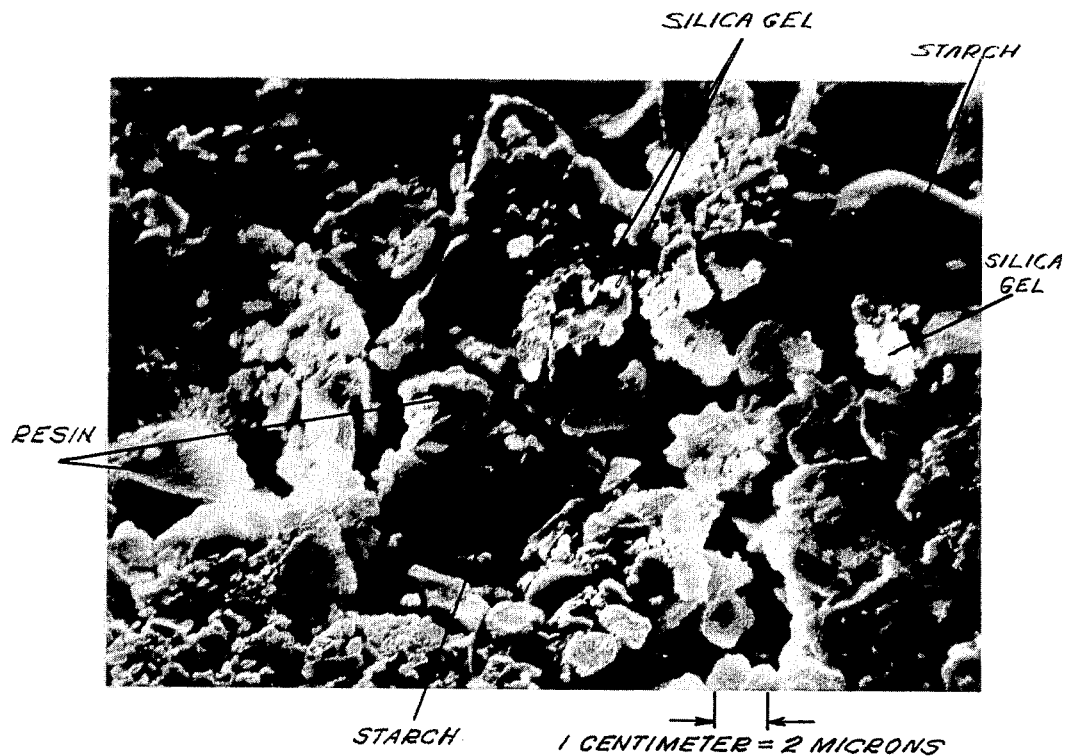
FIG. 2 is a reproduction of a photograph taken by scanning electron photo-microscopy (5000×) of a dry mixture of irregularly shaped polymer or resin particles, starch grandules and silica gel particles before being steam jet cooked.
Figure 3:
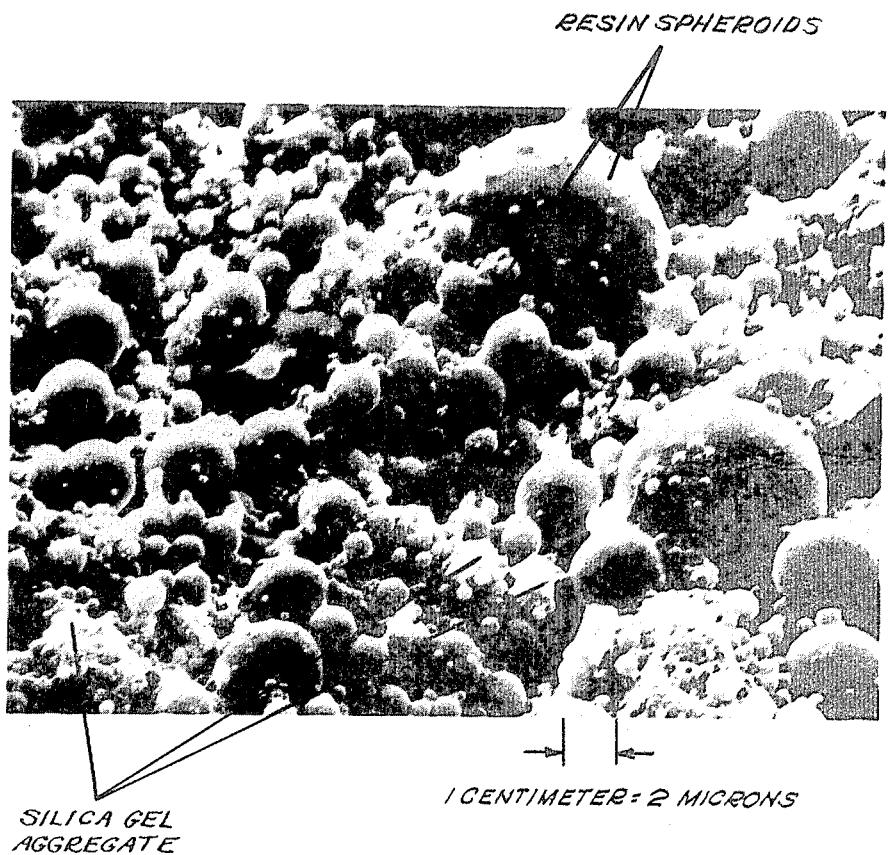
FIG. 3 is a similar reproduction of a similar mixture after being steam jet cooked showing the spheroidal shape of the polymer or resin particles after being steam jet cooked.

With reference to FIGS. 2 and 3 of the drawings, FIG. 2 is a reproduction of a photograph, at 5000 times enlargement, of a dry mixture of various particles making up the principal solids of my composition, with lead-lines to the resin, or polymer particles, the starch granules and the silica gel particles. The scale of magnification, as illustrated, is such that 1 centimeter equals 2 microns.

FIG. 3 illustrates a mixture similar to that of FIG. 2 but after the mixture has been subjected to the melting and atomizing of polymer or resin particles by the jet cooking step. The resin, as indicated by the lead-lines, is in spheroidal particle form, with the largest particles not over about 10 microns or less in diameter and the smallest in the neighborhood of 0.25 micron or less. It is to be noted that the resin, or polymer, notwithstanding its tendency to coalesce in a suspended molten state, appears in the photograph (FIG. 3) as discrete, almost perfect spheres of varying sizes. Such varying sizes of spheres are probably the result of the high shearing forces of the steam acting with varying intensity upon the molten resin, or polymer, while in contact with the steam jet. The silica gel appears mostly in the form of aggregates. The starch or other binder has been dissolved and/or gelatinized to form a film during the steam jet cooking step and such film does not show up in the reproduction of the photograph that FIG. 3 represents.

On the basis of the results of scanning electron photomicroscopy (5000×) studies, applicant believes that the size range of the resin, or polymer, particles before jetting are largely within the limits of from about 2 to 20 microns in maximum dimensions, and that the major portion of spheroidal resin particles obtained after the jetting step is from about 0.1 to 10 microns in diameter. The resin particles produced by mechanical grinding in an attritor include some very fine particles, and these doubtless produce even finer particles after jetting, probably as fine as 0.1 micron.

The essential constituents of my emulsion composition where starch is the colloid-forming binder are the following:

a resin, or polymer, as herein defined, in the form of generally discrete spheroidal particles the majority of which are of less than about 10 microns maximum diameter;

a gelatinized starch, associated with said resin, or polymer, in an amount sufficient to insure the formation of a stable aqueous emulsion of colloid-protected resin spheres; and sufficient water to give a solids content of between about 15 and 75% by weight of the emulsion.

The colloidal binder, whether gelatinized starch, latex or other water-dispersible hydrophilic adhesive, should be present in a minimum amount of about 5% by weight of the resin or polymer solids. Most generally, a surfactant compatible with the binder (and with any other constituents that may be present in the final coating composition of which the aqueous resin emulsion forms a part), is included in the slurry fed to the jet eductor, but the surfactant may be added later in forming the coating slurry. Anionic surfactants that function as dispersants for pigments such as clay are preferred.

In the coating of paper, the method employed has a bearing upon the amount of solids provided in the coating composition used. Commonly used methods of coating paper include: roll, air-knife and trailing blade coating, among others. If the coating composition is applied by an air-knife coater, the composition should have a dry solids content between a minimum of 15% and a maximum of 40% by weight, whereas for roll-coating and trailing blade-coating the corresponding figures would be from 30 to about 70%. In any case, the range of practical coating weights (dry basis) of resin, or polymer, per ream of 500 sheets, 25 x 38 inches, or a total of 3300 square feet, would be from 0.25 to 0.3 lbs. minimum weight, to a maximum weight of from 1.0 to 1.2 lbs./ream, with an average range of from 0.5 to 0.6 lbs. of resin/ream.

I claim:

1. A method of preparing an aqueous emulsion of a meltable oil-soluble but water-insoluble acidic phenolic polymeric material selected from the groups consisting of phenol-aldehyde and phenol-acetylene resins, which comprises:

conducting an aqueous slurry of a mixture of said polymeric material and a hydrophilic colloid-forming binder selected from the group consisting of starches and gums into admixture with a high velocity flow of steam along a confined path, the amount of steam available for forming and maintaining such admixture being equivalent to at least 1.25 times the amount of steam that is condensed as said steam raises the temperature of said admixture above the melting point of said polymeric material, and subjecting said polymeric material to the melting and shearing action of said steam to convert said slurry into an aqueous emulsion of said polymeric material the major portion of which is in the form of particles having maximum dimensions less than about 10 microns and having said binder associated therewith in a sufficient proportion to serve as a protective colloid therefor to stabilize said aqueous emulsion, and said emulsion having a total solids content of between 15 and 75% by weight thereof.

2. The method as defined by claim 1 wherein said slurry is one that has been formed of mechanically ground relatively coarse particles of the polymeric material, and said polymeric material is a permanently fusible polymer having a melting point between about 120° and 220° F.

3. The method as defined by claim 2, wherein said polymer is a phenyl phenol polymer having a free hydroxyl group.

4. The method as defined by claim 1, wherein said colloid-forming binder is starch.

5. The method as defined by claim 1, wherein said admixture is formed by flowing said slurry under pressure into said flow of steam at a point where said steam is at a sufficiently high velocity and under sufficient pressure to exert a high energy shearing force upon said polymeric material in said slurry.

6. The method as defined by claim 3, wherein said binder is initially a raw starch and is converted by steam into a colloid.

7. The method as defined by claim 1, wherein said method is carried out in a steam eductor system and said slurry is pumped into said steam flow.

8. The method as defined by claim 7, wherein said slurry includes a wetting agent in addition to said polymeric material.

9. The method as defined by claim 1, wherein said slurry has a total solids content from 15 to 70% by weight.

10. The method as defined by claim 1, wherein said aqueous emulsion has a total solids content of between 15 and 70% by weight.

11. The method as defined by claim 8, wherein said slurry includes silica.

12. The method as defined by claim 2, wherein the mechanically ground particles in said slurry are converted into spheriodal particles the major portion of which have a maximum diameter of less than about 10 microns solely by virtue of melting and shearing action of said steam without further mechanical grinding.

13. The method as defined by claim 12, wherein after providing a stable emulsion, additional materials selected from the group consisting of a silica, a latex, a clay and calcium carbonate are incorporated into said emulsion and the total solids content of the resulting emulsion is adjusted to a total solids content of between 15 and 70% by weight.

14. A coating composition comprising an aqueous emulsion of dispersed solid particles of oil-soluble but water insoluble, acidic polymeric material selected from the group consisting of phenol-aldehyde and phenol acetylene resins having softening points between about 120° and 225° F., a wetting agent and a hydrophilic colloidal binder material selected from the group consisting of starches and gums associated with said polymeric material to stabilize the particles thereof in a dispersed state, said emulsion having a solids content of between 15 and 75% by weight thereof and the major portion of said particles having maximum dimensions of less than about 10 microns.

15. A coating composition as defined by claim 14, wherein said polymeric material is in a generally spheroidal form.

16. A coating composition as defined by claim 15, wherein said polymeric material is a phenolic polymer having a free hydroxyl group.

17. A coating composition as defined by claim 16, wherein said polymeric material is a phenyl phenolic polymer having a free-hydroxyl group in para-position and said polymer is substantially free from cross-linking groups.

18. A coating composition as defined by claim 14, wherein said binder material is a cooked starch.

19. A coating composition as defined by claim 14, wherein said aqueous emulsion contains a total solids content of between 15 and 70% by weight.

20. A coating composition as defined by claim 19, wherein said emulsion contains in addition to said polymeric and binder materials, a material selected from the group consisting of a silica, a latex, a clay and calcium carbonate, stably dispersed in said emulsion.

21. A coating composition as defined by claim 14, wherein said particles of said polymeric material are in the form of spheres produced by the steam-jet-shearing action on said polymeric material in a melted state and the congealing of the resulting spheres occurs without any substantial coalescence of said spheres.

References Cited
UNITED STATES PATENTS

| | | | |
|---|---|---|---|
| 3,476,695 | 11/1969 | Miller et al. | 260—17.2 R |
| 3,182,031 | 5/1965 | Bauer et al. | 260—17.2 R |
| 3,455,721 | 7/1969 | Phillips et al. | 117—36.2 |
| 3,133,836 | 5/1964 | Winfrey | 127—71 |

FOREIGN PATENTS

| | | | |
|---|---|---|---|
| 846,239 | 7/1970 | Canada | 260—17.2 R |

OTHER REFERENCES

Chem. Abstracts, vol. 69, 1968, 20125X, "Continuous . . . Steam," Trieschmann et al.

WILLIAM H. SHORT, Primary Examiner

E. WOODBERRY, Assistant Examiner